United States Patent [19]

Van der Drift et al.

[11] Patent Number: 4,778,833

[45] Date of Patent: Oct. 18, 1988

[54] COMPOSITION FOR THE PRESERVATION OF WOOD

[75] Inventors: Jan W. P. T. Van der Drift, Zoetermeer; Jan La Brijn, Pynacker, both of Netherlands

[73] Assignee: Nederlandse Centrale Organisatie voor Toegepast- Natuurweten- Schappelijk Onderzoek, The Hague, Netherlands

[21] Appl. No.: 941,538

[22] Filed: Dec. 11, 1986

Related U.S. Application Data

[63] Continuation of Ser. No. 698,547, Feb. 5, 1985, abandoned.

[30] Foreign Application Priority Data

Feb. 3, 1984 [NL] Netherlands ............................ 8400339

[51] Int. Cl.$^4$ ............................ B27K 3/20; B27K 3/34; B27K 3/16
[52] U.S. Cl. ............................ 523/177; 524/404; 524/405; 524/438; 524/516; 524/517; 524/503; 525/192; 525/193; 525/194; 525/197; 525/198; 525/207
[58] Field of Search ............... 523/177; 524/404, 405, 524/438, 516, 517, 503; 525/197, 198, 207

[56] References Cited

U.S. PATENT DOCUMENTS

| | | | |
|---|---|---|---|
| 3,960,798 | 6/1976 | Nakazawa et al. | 524/557 |
| 3,966,672 | 6/1976 | Gaylord | 524/445 |
| 3,968,093 | 7/1976 | Hasegawa et al. | 524/701 |
| 4,008,191 | 2/1977 | Grodzinski et al. | 525/392 |
| 4,094,694 | 6/1978 | Long | 524/405 |
| 4,098,969 | 7/1978 | Zimmermann et al. | 525/61 |
| 4,207,402 | 6/1980 | Sprenckle | 521/88 |
| 4,231,829 | 11/1980 | Marui et al. | 427/149 |
| 4,258,849 | 3/1981 | Miller | 428/290 |
| 4,277,576 | 7/1981 | Straub et al. | 523/123 |
| 4,331,781 | 5/1982 | Zimmermann et al. | 525/61 |
| 4,332,917 | 6/1982 | Heslinga et al. | 525/194 |
| 4,338,417 | 7/1982 | Heslinga et al. | 525/197 |
| 4,372,447 | 2/1983 | Miller | 428/290 |
| 4,373,075 | 2/1983 | Schwarz | 526/314 |
| 4,496,613 | 1/1985 | Zagefka et al. | 523/333.2 |
| 4,511,695 | 4/1985 | Lindner et al. | 525/83 |
| 4,513,301 | 4/1985 | Takayama et al. | 428/522 |
| 4,514,543 | 4/1983 | Dean | 525/205 |
| 4,537,807 | 8/1985 | Chan | 428/511 |
| 4,619,793 | 10/1986 | Lee | 525/61 |

FOREIGN PATENT DOCUMENTS

| | | |
|---|---|---|
| 1009956 | 5/1977 | Canada . |
| 2419795 | 4/1974 | Fed. Rep. of Germany . |
| 7908799 | 12/1979 | Netherlands . |

OTHER PUBLICATIONS

Kirk-Othmer Encyclopedia of Chemical Technology, 3rd Edition, vol. 24.
Opposition Papers with attachments (filed with the European Patent Office, Aug. 1987).
Bulletin of the Chemical Society of Japan, vol. 56, No. 7, Jul., 1983, pp. 2177-2178.

*Primary Examiner*—Herbert J. Lilling
*Attorney, Agent, or Firm*—Cushman, Darby & Cushman

[57] ABSTRACT

Composition for the preservation of wood containing a wood preservative, such as a boron compound or a fluorine compound, in a polymer or polymer composition, which upon contact with water releases the wood preservative. Said composition is introduced into a hole in the wood or in a wood construction, whereafter the hole is sealed.

41 Claims, No Drawings

COMPOSITION FOR THE PRESERVATION OF WOOD

This is a continuation of application Ser. No. 698,547 filed Feb. 5, 1985, now abandoned.

The invention relates to a composition and a process for the preservation of wood.

It is generally known that wood may be preserved by impregnating it, where appropriate under reduced pressure, with solutions, emulsions or suspensions which contain wood preservatives. Disadvantages of this method of preservation are that in most cases much more preservative is used than is effectively needed for the preservation, since it is desired to compensate for losses by leaching-out and evaporation and since the preservative is also introduced into parts of the wood where it is not directly necessary, that it is often troublesome to introduce the preservatives into the wood, that the preservatives, as regards their toxicity, are often dangerous to those who carry out the wood preservation treatment and that burning of wood thus treated can result in pollution of the environment.

These disadvantages are also encountered with the process of the German Patent Specification No. 1,299,848, according to which a mixture of 35–50% by weight of boric acid and 65–50% by weight of ammoniumbifluoride is used as a wood preservative, as well as with the process of the Swiss Patent Specification No. 306,709, according to which an aqueous solution of bifluorides, such as a mixture of potassium bifluoride and ammoniumbifluoride, is applied on the wood and care is taken that the gases formed in the wood cannot escape therefrom, e.g. by coating the wood with a water-soluble synthetic resin.

Consequently, many attempts have been made to overcome these disadvantages. Thus, according to Netherlands Patent Application No. 77,03412 wood preservatives have been introduced only locally into the wood by applying a wood preservative in liquid or paste-like form into a hole made in the wood and thereafter tightly sealing the hole. In this way, a source of the wood preservative is introduced into the wood and continuously releases the preservative. If, for example, the preservative is taken up in a solvent which evaporates slowly impregnation of the wood takes place gradually around the hole. A disadvantage of this method is, however, that penetration of the preservative into the wood also occurs where this is not necessary because no moisture is present and thus fungi are not active. Consequently, after a relatively short time the preservative has become fixed in the wood over a limited distance, for example 5–8 cm, around the point of introduction. When using commercial products on this basis, in the form of capsules containing, for example, tributyltin oxide in an organic solvent, which capsules are introduced into the hole and thereafter crushed by introducing a dowel, the capsules then releasing their contents to the surrounding zone, it is necessary to work very carefully and to ensure that the skin and clothing do not become contaminated with the content of the capsules when the latter are broken.

Further, Netherlands Patent Application No. 78,10841 discloses a process wherein fused bodies are introduced into drill holes in the wood, which bodies contain a wood preservative which is solid at ambient temperature. Boron trioxide is mentioned as an example of such an agent. In addition to boron trioxide, other metal oxides may also be present, these serving to control the rate of solution of the boron trioxide in water or to increase the preservative action. Suitable materials are, for example, oxides of alkali metals, which increase the rate of solution, oxides of alkaline earth metals or silicon, which reduce the rate of solution, or copper, tin or zinc oxides, which boost the preservative action of the boron trioxide. The fused body is in the shape of a rod, block or ball which fits into the drill hole which has been made. Disadvantages of this process are that boron trioxide is a relatively expensive substance and that a high concentration of boron trioxide in certain positions is disadvantageous in that it causes boron trioxide to leach through a coat of paint applied to the wood.

The same disadvantages are encountered with the use of a wood preserving tablet comprising a mixture containing at least two boron compounds selected from any two of the three groups of boron compounds namely (a) borates, (b) boric acids and (c) boric oxides as disclosed in U.K. Patent Application No. 2,114,003.

It is the object of the invention to overcome the disadvantage of the known compositions and processes and to develop compositions which when used in certain positions in the wood and wood constructions result in long-lasting preservation, with release of wood preservative taking place only in positions where this is necessary, and when this is really necessary.

It has been found that these objectives are achieved with compositions which contain the wood preservatives in a polymer or polymer composition which on coming into contact with water releases the wood preservative. This polymer or this polymer composition containing the wood preservative is introduced into the wood or the wood construction.

When such compositions have been introduced into the wood, the actual wood preservatives enter the wood only when the latter becomes damp, in other words when there is a danger of rotting. When the wood remains dry, the preservative does not penetrate into it. The preservative thus remains available for longer than is the case in the processes hitherto used. Moreover, as a result of the very gradual release of the wood preservative and the lower local concentration thereof than was possible hitherto, leaching through of the agent through paint coats is not to be expected.

Polymers or polymer compositions which are suitable for the compositions according to the invention are water-soluble and water-swellable polymers or polymer compositions. The water-soluble polymers include, for example, water-soluble polyvinylpyrrolidone, polyvinyl alcohol, polyethylene glycol and polyacrylamide.

Water-swellable polymers or polymer compositions are particularly suitable, for example the so-called polymer alloys which are known from Netherlands Patent Application No. 79,08799. These are polymer alloys which are stable at up to high temperatures, are homogeneous, and are prepared from component (a) one or more high molecular polymers possessing anhydride groups and component (b) one or more high molecular polymers containing groups which can interact with hydrogen atoms, in which alloy the components (a) and (b) are bonded to one another via a hydrogen bridge through complete or partial protolysis of component (a). In general, components (a) and (b) each have a molecular weight of at least 10,000. Components (a) consists, for example, of one or more high molecular copolymers of a monomer with alkene unsaturation, preferably styrene and maleic anhydride, and component (b) of polymers possessing ester groups, for example polyvinyl acetate, a copolymer of ethylene and vinyl acetate, a polyacrylate, a polymethacrylate or cellulose esters. These polymers can be prepared, for example, by first preparing a solution of component (a) in an organic solvent, to which solution there is then added component (b), with the component (a) present in solution being completely or partially protolysed under the action of protolysing agents, before or after the addition of component (b), after which the solvent is removed. Examples of particularly useful polymer alloys are copolymers of styrene and maleic anhydride together with polyvinyl acetate in weight ratios of, for example, 10:90 to 70:30, 25:75 to 60:40, and especially of 30:70 to 50:50.

However, other polymers or copolymers which conform to the requirement that only upon contact with water do they release the active wood preservative may also be used.

The mechanism which comes into action when using the compositions for the preservation of wood can be explained as follows with reference to the polymer alloy known from Netherlands Patent Application No. 79,98799. Upon contact with water, the polymer alloys swell and the wood preservative contained in the polymer alloy is released to the surroundings. The swelling is reversible. When the polymer alloy is no longer in contact with water, the swelling and hence the release of the active agent diminishes. Both the speed of swelling and the degree of swelling influence the rate of release of the wood preservative and the release thereof can thus be regulated. Moreover, the rate of release depends on the shape and size of the particles which are introduced into the wood or the wood construction. The composition is mostly used in the form of pellets, granules, tablets, cylindrical shapes and the like.

When the polymer or polymer composition in the hole in the wood is swelling upon contact with moisture, it is pressed against the wall of the hole. Thereby the transfer of active substance from the composition in the hole to the surrounding wood is promoted.

For the accurate control of the release of the wood preservative it may be desirable to coat the polymer or the polymer composition, containing the wood preservative, with a water permeable coating, thereby retarding the release of the wood preservative from the actual composition. Possible materials for the coating are polymers having satisfactory water permeability. For example, water soluble or water-swellable polymers of polymer compositions, such as are employed for the actual compositions containing the wood preservative, may be used for the coating. The coating may for example be applied by dipping the polymer or the polymer composition, containing the wood preservative, in a coating solution consisting of a polymer or a polymer composition in an organic solvent, such as acetone, butan-1-one, or butan-2-one. The concentration of the polymer or the polymer composition in this solution is, for example, 10–30% by weight, and generally around 20% by weight. By varying the polymer or polymer composition of the coating and the polymer or polymer composition containing the wood preservative, the most desirable rate of release of the wood preservative employed can be found experimentally. The thickness of the coating also plays a role.

As a wood preservative it is in principle possible, to use in the composition and in the process according to the invention, all wood preservatives suitable for this purpose. However, it has been found that boron compounds and fluorine compounds are especially satisfactory. Furthermore, quaternary ammonium compounds appeared to be suitable.

Boron compounds have a long-lasting action and good results are obtained with a mixture of borax and boric acid, for example the commercial product Basilit B (Bayer AG, Leverkusen, Federal Republic of Germany), which product contains 15.2% by weight of boron.

In the compositions according to the invention, fluorine is in general present in the form of a bifluoride. When a composition containing fluorine comes into contact with water in the wood, hydrogen fluoride is formed and this migrates very rapidly through the wood. In practice, the fluorine-containing wood preservative used is, for example, the commercial product Improsol, which contains 42.5% by weight of $KHF_2$, 52.5% by weight of $NH_4HF_2$ and 5% by weight of a wetting agent and which is marketed by Holz-Verf B.V. in Enschede.

Boron and fluorine compounds are less toxic to the user than the tin compounds hitherto extensively used, such as tributyl-tin oxide, or organic chlorine compounds, such as pentachlorophenol. Since polymers or polymer compositions which in the dry state have a very low diffusion coefficient for the wood preservative are used for the pellets, granules, and similar shaped articles, there is little to be feared from touching the shaped pieces when introducing them into the wood. However, as soon as the composition comes into contact with moisture in the wood, it releases its wood preservative, which then performs its function, that is to say destroys the harmful micro-organisms.

Very good results have been obtained with wood preservative compositions of the invention containing both a boron compound and a fluorine compound as wood preservatives. These compounds appear to be compatible. It also appears that it is possible to control the release rate of the active compounds by variation in the composition of the polymer or polymer composition and/or of the coating.

The compositions according to the invention can inter alia be used with very good results to preserve deal, which per se does not keep very well but which is troublesome to impregnate. Also with oak good results have been obtained.

It should be noted that in the wood preservative composition according to the invention the wood preservative can be incorporated into the polymer or polymer composition together with fillers, such as saw dust, or with other additives.

Per se, it was known how to incorporate preservatives in polymers. Thus, Netherlands Patent Application No. 77,03306 discloses a process for the preparation of non-fouling paints, in particular for ships, wherein, in one stage of the process of preparation, solid toxic substances, for example organo-tin compounds, are added in the form of granules, scales or pieces, which consist of a matrix of one or more polymeric paint binders containing finely dispersed toxic substance particles, optionally complemented with other materials customary in the paints industry. The granules, scales or pieces of polymer matrix and toxic substance can be dissolved in a paint solvent, using a simple mixing apparatus, and thus give a non-fouling paint. However, the polymers used for this purpose absorb very little or no water and upon contact with water release the toxic substance only extremely slowly. Hence, they are unsuitable for use in the preservation of wood, where rapid release of wood preservative upon contact with water is necessary.

Further, it is known from Netherlands Patent Application No. 77,03305 to prepare paint compositions which consist of a combination of one or more water-insoluble polymeric binders, one or more water-soluble polymeric binders and one or more sparingly water-soluble solid toxic substances, optionally complemented with other materials customary in the paint industry, the ratio of the components being so chosen that upon painting surfaces normally exposed to water the paint coat obtained, upon exposure to the surface water during navigation abrades in such a way that just sufficient toxic substance is released to prevent fouling of the painted article. During the abrasion, the water-soluble component is dissolved and the integrity of the outermost layer is destroyed. The latter releases the toxic substance contained therein, after which the same takes place with the layer directly beneath the outermost layer. The compositions according to the present invention are unusable for this known application. Soluble polymers or polymer compositions present in the compositions according to the present invention will, upon contact with water, rapidly and completely disintegrate therein, while water-swellable polymers or polymer compositions will release the toxic substance much too rapidly though, in contrast to the combinations of polymers used according to Patent Application No. 77,03305, they will not lose their integrity. For use in preserving wood, on the other hand, the combinations of polymers according to Patent Application No. 77,03305 cannot be used since, in the preservation of wood, no abrasion or shear forces occur.

Further, it is known from Netherlands Patent Application No. 69,11410 to use synthetic high molecular polymers as carriers in granules which contain substances having a biological, in particular pesticidal, action. However, in this literature reference no mention is made of the use of the granules for preserving wood, and equally there is no mention of a polymer or polymeric composition which in the presence of water releases wood preservative and/or forms a hydrogel which only slowly releases wood preservatives contained in the composition.

Finally it is known from Bull. Chem. Soc. Jpn 56, 2177–2178 (1983) to react the fungicidal compound o-phenylphenol with acryloylchloride and to subject the resulting 2-biphenylylacrylate to homopolymerization or to copolymerization with vinylacetate, styrene or N-vinylpyrrolidone. When the polymer or copolymer obtained was subjected to hydrolysis at pH 6 and 8, it appeared that the o-phenylphenol was released gradually from the molecule of the polymer or copolymer to which it was chemically bound. However, in the compositions of the invention the wood preservative is not chemically bound to the molecule of the polymer or polymer composition.

The examples which follow illustrate the invention without imposing a limitation thereon.

EXAMPLE I

This example describes the preparation of a number of compositions which contain boron in the form of the preparation Basilit B, a mixture of borax and boric acid having a boron content of 15.2% by weight. The polymers used for the compositions were polymer alloys obtained according to Netherlands Patent Application No. 79,08799.

The following compositions were prepared:

Composition B1

Small sheets of size 45×80×1 mm were compression-molded from granules of a polymer alloy consisting of 30% by weight of a copolymer of styrene and maleic anhydride and 70% by weight of polyvinyl acetate, at a temperature of 155° C. and under a pressure of 3432 kPa for 5 minutes. These sheets were dipped in an aqueous solution of 15% by weight of Basilit B at a temperature of 70° C. After 3 hours, maximum swelling had been reached, after which the sheets were dried in a forced stream of air at 50° C. The weight increase was 50.7%. This corresponds to a Basilit B content of 33.6% by weight.

Composition B2

Composition B1 was immersed in a 20% by weight solution, in butane-2-one, of a polymer alloy consisting of 10% by weight of copolymer of styrene and maleic anhydride and 90% by weight of polyvinyl acetate. After it had been dried in a forced stream of air at 50° C., the composition obtained was again immersed in a 20% by weight solution of the said polymer alloy in butane-2-one. The composition was again dried in a forced stream of air at 50° C. The thickness of the coating with the polymer alloy of 10% by weight of a copolymer of styrene and maleic anhydride in 90% by weight of polyvinyl acetate was 160–170 μm.

Composition B3

Using the method described for composition B2, composition B1 was twice immersed in a 20% by weight solution, in butane-2-one, of a polymer alloy consisting of 30% by weight of a copolymer of styrene and maleic anhydride and 70% by weight of an ethylene/vinyl acetate copolymer, and was then dried.

Composition B4

Using the method described for composition B1, small sheets were produced from a polymer alloy consisting of 50% by weight of a copolymer of styrene and maleic anhydride and 50% by weight of polyvinyl acetate. 40.5% by weight of Basilit B is introduced therein by impregnation.

Composition B5

Composition B4 was coated by immersion with a 20% by weight solution in butane-2-one of a polymer alloy consisting of 30% by weight of a copolymer of styrene and maleic anhydride and 70% by weight of a copolymer of ethylene and vinyl acetate, in the manner described for composition B3.

Composition B6

A powder mixture consisting of 33% by weight of Basilit B and 67% by weight of a polymer alloy consisting of 30% by weight of a copolymer of styrene and maleic anhydride and 70% by weight of polyvinyl acetate was prepared. This mixture was first compression-molded for 15 minutes at 155° C. and thereafter ground and subsequently again compression-molded for 15 minutes at 190° C. to give sheets of 1 mm. These sheets melted during the second pressing and were relatively clear and homogeneous.

Composition B7

Small sheets of 2 mm thickness were produced in the manner described for composition B6.

Composition B8

Small sheets were produced, in the manner described for composition B6, from a powder mixture consisting of 50% by weight of Basilit B and 50% by weight of a polymer alloy consisting of 30% by weight of a copolymer of styrene and maleic anhydride and 70% by weight of polyvinyl acetate.

Composition B9

10% by weight of triacetin were added, by atomising, to a mixture of 50% by weight of ground easily swellable foam of a polymer alloy consisting of 30% by weight of a copolymer of styrene and maleic anhydride and 70% by weight of polyvinyl aetate, and 50% by weight of Basilit B. Homogeneous small sheets were obtained by sinter-pressing at room temperature and subsequent pressing at 160° C. for 15 minutes.

Composition B10

Using the method described for composition B9, a mixture of 50% by weight of ground Basilit B and a pulverulant polymer alloy consisting of 50% by weight of a copolymer of styrene and maleic anhydride and 50% by weight of polyvinylacetate was compression-moulded to give small sheets.

Composition B11

Basilit B powder was compression-molded at 90° C. to give small sheets. These sheets were coated, in the same manner as that described for composition B2, with a 20% by weight solution, in butane-2-one, of a polymer alloy consisting of 30% by weight of a copolymer of styrene and maleic anhydride and 70% by weight of an ethylene/vinyl acetate polymer.

Composition B12

Basilit B powder was compression-molded at 190° C. to give small sheets. These sheets were coated, in the manner described for composition B2, with a 20% by weight solution, in butane-2-one, of a polymer alloy consisting of 10% by weight of a copolymer of styrene and maleic anhydride and 90% by weight of polyvinyl acetate.

The sheets, thus obtained, of compositions B1 to B12 inclusive were introduced into a polyethylene bottle containing 150 ml of distilled water. The bottle plus contents was carefully shaken at room temperature by means of a shaking machine which had a travel of 10 cm and a frequency of 20 oscillations per minute. A sample of 10μ liter was dried after 30 minutes, 2 hours, 8 hours and 30 hours respectively. This sample was subsequently diluted 50-fold and analysed for boron. From the results obtained, the half-life was determined, that is to say the time at which half of the originally present boron had been released from the polymer matrix. These half-lives are shown in Table A below.

TABLE A

| Half-lives (t) for the release of boron from compositions B1 to B12 inclusive | | | |
|---|---|---|---|
| Composition | t(min) | Composition | t(min) |
| B1 | 10 | B7 | 1060 |
| B2 | 1200 | B8 | 10 |

TABLE A-continued

| Half-lives (t) for the release of boron from compositions B1 to B12 inclusive | | | |
|---|---|---|---|
| Composition | t(min) | Composition | t(min) |
| B3 | 960 | B9 | 10 |
| B4 | 20 | B10 | 10 |
| B5 | 850 | B11 | 420 |
| B6 | 90 | B12 | 280 |

Table A shows that the compositions B1, B4, B9 and B10 exhibit a rapid release of boron because of the hydrophilic effect of these compositions and moreover because of the fragmentation during shaking. At the same time, composition B4 also becomes gel-like. The coating has a marked effect on the release of boron. Thus the half-life of the two compositions B2 and B3 was found to be much greater than that of the uncoated composition B1. Moreover, a coating with a polymer alloy consisting of 10% by weight of a copolymer of styrene and maleic anhydride and 90% by weight of polyvinyl acetate was found to lead to a slower release of boron than a coating obtained with a polymer alloy of 30% by weight of a copolymer of styrene and maleic anhydride and 70% by weight of an ethylene/vinyl acetate copolymer. Furthermore, the mechanical properties of the first-mentioned coating were found to be better than those of the last-mentioned coating this being clear from the flaking-off of the last-mentioned coating during the test concerning the release of boron. In the case of the coated small sheets of pure Basilit B (composition B11 and B 12), the situation is somewhat similar. Here again, the release from samples having the last-mentioned coating was found to occur more rapidly than from sheets having the first-mentioned coating. Finally, however, it is also found that the uncoated sheets dissolved completely within 2 minutes while the coated sheets had a considerable half-life (compositions B11 and B12). From the fact that composition B8 showed a substantially lower half-life than composition B6 it can be concluded that part of the Basilit B present in composition B8 is not dissolved in the polymer matrix.

EXAMPLE II

A number of compositions were prepared with the aid of the preparation Improsol which consists of 42.5% by weight of potassium bifluoride, 52.5% by weight of ammonium bifluoride and 5% by weight of wetting agent. A 10% by weight solution of this preparation in water has a pH of 3.8. The fluoride content of the dry substance is 56% by weight.

The polymers used for compositions F2 and F8 inclusive were polymer alloys obtained according to Netherlands Patent Application No. 79,08799.

Composition F1

A solution of 5.0 g of polyvinylpyrrolidone in 15 ml of distilled water was mixed with a solution of 5 g of Improsol in 15 ml of distilled water. The mixture was carefully evaporated to dryness under reduced pressure at 40° C., to give a final weight of 9.525 g. The weight loss was due to production of hydrogen fluoride. Pills of the mixture obtained were produced by pressing.

Composition F2

Compositions F1 was immersed in a 10% by weight solution, in butane-2-one, of a polymer alloy consisting of 10% by weight of a copolymer of styrene and maleic anhydride and 90% by weight of polyvinyl acetate, in such a way that after removing the solvent the weight of the pills showed an increase of 21%.

Composition F3

Composition F1 was immersed in a 10% by weight solution of a polymer alloy consisting of 30% by weight of a copolymer of styrene and maleic anhydride and 70% by weight of an ethylene/vinyl acetate polymer, in such a way that after removing the solvent the weight of the pills showed an increase of 20%.

Composition F4

Soxleth tubes produced from cellulose fibres and having sizes of $11 \times 28$ mm$^2$ and $9 \times 40$ mm$^2$ were used as the reservoir for Improsol. The length of the tubes was so chosen that the thinner tube was completely filled with 300 mg of Improsol. The wider tube was pushed over the filled thin tube and the sealing join was smeared full with a suspension of cellulose fibres.

Composition F5

Tubes according to composition F4 were impregnated with a 10% by weight solution, in butan-2-one, of a polymer alloy consisting of 30% by weight of a copolymer of styrene and maleic anhydride and 70% by weight of an ethylene/vinyl acetate copolymer, by pouring the butanone solution into the tubes, then again rapidly removing the solution and thereafter allowing the tubes to drain and to dry. The weight increase was 15%.

Composition F6

The Soxleth tubes with composition F4 are impregnated in the manner described for composition F5, with a 10% by weight solution, in butane-2-one, of a polymer alloy consisting of 10% by weight of a copolymer of styrene and maleic anhydride and 90% by weight of polyvinyl acetate. The weight increase was 16%.

Composition F7

15 g of easily swellable foam of a polymer alloy consisting of 30% by weight of a copolymer of styrene and maleic anhydride and 70% by weight of polyvinyl acetate (particle size 0.5–1 mm) were thoroughly mixed, on a roller stand, with 15 g of Improsol (particle size 0.3–0.7 mm). Small sheets of thickness 2 mm were compression-molded from this mixture at room temperature.

Composition F8

The small sheets of composition F7 were coated with a 10% by weight solution, in butane-2-one, of a polymer alloy consisting of 10% by weight of a copolymer of styrene and maleic anhydride and 90% by weight of polyvinyl acetate. The weight increase was 12%.

The pills and tubes containing Improsol were introduced into a polyethylene bottle containing 100 ml of distilled water and shaken carefully at room temperature by means of the shaking machine described in Example I. At regular intervals of time, a sample of 1 ml was taken and mixed with 20 ml of a mixture of equal amounts by weight of distilled water and a buffer. The content of fluoride ions in the solution obtained was determined electrometrically. From the results obtained, the half-life, that is to say the time at which half of the originally present fluorine had been released from the polymer matrix, was determined. These half-lives are shown in Table B below.

TABLE B

| Half-lives (t) of release of fluorine from compositions F1 to F8 inclusive | |
|---|---|
| Composition | t(min) |
| F1 | 16 |
| F2 | 35 |
| F3 | 8 |
| F4 | 25 |
| F5 | 38 |
| F6 | 140 |
| F7 | 18 |
| F8 | 17 |

A comparison of Table B with Table A shows that the release of the fluorine compound in general takes place much more rapidly than the release of boron. In both cases, a coating with a polymer alloy consisting of 10% by weight of a copolymer of styrene and maleic anhydride and 90% by weight of polyvinyl acetate is found to delay the release most.

EXAMPLE III

In the manner described in Example I and Example II a number of compositions were prepared, which contained both Basilit B and Improsol. The formulation of these compositions is shown in table C. The half-lives for the release of boron and of fluorine from said compositions were determined in the manner described in Example I and Example II respectively. The results of these measurements are shown in table D. By way of comparison compositions B4 and F7 were examined once again.

TABLE C

| | Constituents of composition % by weight | | | | Coating | |
|---|---|---|---|---|---|---|
| Composition | Basilit B | Improsol | PSMA/PVAC (50/50) | PSMA/PVAC (30/70) | constituents (proportions) | thickness μm |
| B4 | 40 | 0 | 60 | 0 | no coating | |
| F7 | 0 | 45 | 0 | 55 | no coating | |
| C1 | 23 | 25 | 27 | 25 | no coating | |
| C2 | 23 | 25 | 27 | 25 | PMVMA/PVAC (50/50) | 50 |
| C3 | 23 | 25 | 27 | 25 | PSMA/PVAC (30/70) | 20 |
| C4 | 23 | 25 | 27 | 25 | PSMA/PVAC/PVAL (30/35/35) | 50 |
| C5 | 23 | 25 | 27 | 25 | PSMA/PVAC (30/70) | 50 |
| C6 | 23 | 25 | 27 | 25 | PSMA/PVAC (30/70) stearyl aminated | 50 |

TABLE C-continued

|  | Constituents of composition % by weight | | | | Coating | |
|---|---|---|---|---|---|---|
| Composition | Basilit B | Improsol | PSMA/PVAC (50/50) | PSMA/PVAC (30/70) | constituents (proportions) | thickness μm |
| C7 | 31 | 33 | 36 | 0 | PMVMA/PVAC (50/50) | 50 |

Legenda of Table C.
PSMA = copolymer of styrene and maleic anhydride
PVAC = polyvinylacetate
PMVMA = copolymer of methylvinylether and maleic anhydride
PVAL = copolymer of vinylacetate and vinyllaurate (80/20)
(For PSMA/PVAC (50/50) vide composition B4 in Example I)
(For PSMA/PVAC (30/70) vide composition F7 in Example II)

TABLE D

Half-lives (t, hours) for the release of boron and fluorine from compositions B4, F7 and C1 to C7 inclusive

| Composition | boron | fluorine |
|---|---|---|
| B4 | 0.33 | — |
| F7 | — | 0.35 |
| C1 | 1.3 | 1.0 |
| C2 | 5.5 | 3.6 |
| C3 | 9 | 8.3 |
| C4 | 17 | 23.5 |
| C5 | 21 | 38 |
| C6 | 28 | 55 |
| C7 | 2.3 | 1.5 |

EXAMPLE IV

Preservation tests were carried out with composition B4 from Example I and composition F7 from Example II. From composition B4, cylinders with a height of 30 mm and a diameter of 11.8 mm, thus having a volume of 3338 mm³, were produced. From composition F7, cylinders with a height of 30 mm and a diameter of 12.0 mm, thus having a volume of 3394 mm³, were produced.

100 test blocks of the wood variety *Picea abies* (deal) were produced. The dimensions were 40×70×300 mm (end-face surface 40×70 mm). The angle which the year rings made with the sides of the end faces was 45°.

A hole 50 mm deep was drilled in the centre of the 40×300 mm surface. In the case of the 50 blocks intended for composition B4 the diameter was 12.5 mm and in the case of the 50 blocks which were intended for composition F7 the diameter was 13.0 mm.

4 similar holes with a diameter of 3.2 mm and a depth of 17 mm were drilled at 20 and 50 mm distance of the centre of the above-mentioned drill holes. An insulated brass nail was hammered into each hole. The nails served, in pairs as measurement points for the determination of the moisture content in the test blocks during the test.

The appropriate compositions were introduced into the blocks after which the holes were sealed with a beechwood dowel of height 20 mm and diameter 12.5 or 13 mm respectively.

Each series of 50 blocks was divided into two groups of 25 blocks, namely two groups per composition. One group per composition was kept at a relative humidity (RH) of 90% at room temperature while the blocks of the other group were placed with one end face on the bottom of glass pots. Thereafter, sufficient demineralized water was introduced into the pots for about 75 mm of the blocks to stand under water.

The moisture content of the test blocks was determined before starting the test and after 1, 2, 4, 8 and 12 weeks. For this, an electrical moisture meter from Siemens was used. The brass nails served as the measurement points.

After 2, 4, 8, and 12 weeks 5 blocks from each group of 25 blocks were dried for 3 days at room temperature. Thereafter they were sawn through in the lengthwise direction parallel to the 70×300 mm surface. On the sawn surface of one of the two halves obtained from each block, the active substance concerned was colour-revealed by means of a suitable reagent.

The degree of diffusion was determined by measuring the surface of the coloured zones by means of a planimeter. In the case of the blocks taken out of water, the coloured zones on the water side and the air side were measured separately.

The color reagents used for boron were a solution of 240 mg of curcumin in 200 ml of ethanol and a solution of 12.0 g of salicylic acid in 40 ml of concentrated hydrochloric acid and 60 ml of ethanol. The sawn surface was successively sprayed with these solutions. If boron was present, a purplish red color resulted. The color reagents used for fluorine were a solution of 840 mg of alizarin in 99.2 ml of water and a solution of 840 mg of zirconium chloride in 40 ml of 25% by weight hydrochloric acid and 59.2 ml of water. The sawn surface was sprayed with a mixture of the two solutions in a ratio of 1:1. If fluorine was present, a yellow color resulted.

The results of the moisture measurements are shown in Tables E and F and the results of the measurements of the colored surface areas are shown in Tables G and H.

TABLE E

Moisture contents in percent of blocks of deal. Mean of 5 measurement results.
Measurement point A: 20 mm from the centre of the borehole
Measurement point B: 50 mm from the centre of the borehole
Composition: B4

| | Start | | After 1 week | | After 2 weeks | | After 4 weeks | | After 8 weeks | | After 12 weeks | |
|---|---|---|---|---|---|---|---|---|---|---|---|---|
| Conditions | A | B | A | B | A | B | A | B | A | B | A | B |
| 90% relative humidity | 9.2 | 9.5 | 11.5 | 11.6 | 16.2 | 16.9 | 18.2 | 18.0 | 18.0 | 18.0 | 20.3 | 20.1 |
| Above water | 9.6 | 9.5 | 14.4 | 16.4 | 17.8 | 21.4 | 22.0 | 28 | 23.0 | >28 | >28 | >28 |

TABLE F

Moisture contents in percent of blocks of deal. Mean of 5 measurement results.
Measurement point A: 20 mm from the centre of the borehole
Measurement point B: 50 mm from the centre of the borehole
Composition: F7

| Conditions | Start A | Start B | After 1 week A | After 1 week B | After 2 weeks A | After 2 weeks B | After 4 weeks A | After 4 weeks B | After 8 weeks A | After 8 weeks B | After 12 weeks A | After 12 weeks B |
|---|---|---|---|---|---|---|---|---|---|---|---|---|
| 90% relative humidity | 9.8 | 9.7 | 12.4 | 11.4 | 19.2 | 16.3 | 24.6 | 18.2 | >28 | 26.5 | >28 | >28 |
| Above water | 9.8 | 9.8 | 14.4 | 16.1 | 23.1 | 21.2 | 26.0 | >28 | >28 | >28 | >28 | >28 |

TABLE G

Diffusion surface areas in cm$^2$ and in percent of the cross-sectional
surface area of the test block (= 210 cm$^2$)
Composition: B4

| | 90% relative humidity | | | | | Above water | | | |
|---|---|---|---|---|---|---|---|---|---|
| | After 2 weeks | After 4 weeks | After 8 weeks | After 12 weeks | | After 2 weeks | After 4 weeks | After 8 weeks | After 12 weeks |
| Diffusion surface area in cm$^2$ | 13.0 | 11.7 (4) | 15.0 | 19.6 | (1) | 6.1 | 7.3 | 11.4 | 17.8 |
| | | | | | (2) | 6.6 | 6.2 | 11.2 | 18.2 |
| | | | | | (3) | 12.7 | 13.5 | 22.6 | 36.0 |
| Diffusion surface area in percent of the cross-sectional area of the test block | 6.0 | 5.5 (4) | 7.1 | 9.3 | (1) | 2.9 | 3.4 | 5.4 | 8.4 |
| | | | | | (2) | 3.1 | 2.9 | 5.3 | 8.6 |
| | | | | | (3) | 6.0 | 6.3 | 10.7 | 17.0 |

(1) water side
(2) air side
(3) total
(4) Since the colour reactions were carried out at different intervals of time on different blocks, variations in the results must be expected. The relatively low values after 4 weeks are ascribed to this.

TABLE H

Diffusion surface areas in cm$^2$ and in percent of the cross-sectional
surface area of the test block (= 210 cm$^2$)
Composition: F4

| | 90% relative humidity | | | | | Above water | | | |
|---|---|---|---|---|---|---|---|---|---|
| | After 2 weeks | After 4 weeks | After 8 weeks | After 12 weeks | | After 2 weeks | After 4 weeks | After 8 weeks | After 12 weeks |
| Diffusion surface area in cm$^2$ | 51.4 | 78.7 | 92.1 | 111.8 | (1) | 30.1 | 51.1 | 59.2 | 59.7 |
| | | | | | (2) | 28.5 | 43.4 | 50.0 | 54.0 |
| | | | | | (3) | 58.6 | 94.5 | 109.2 | 113.7 |
| Diffusion surface area in percent of the cross-sectional area of the test block | 24.4 | 37.4 | 43.8 | 53.2 | (1) | 14.3 | 24.3 | 28.2 | 28.4 |
| | | | | | (2) | 13.5 | 20.6 | 23.8 | 25.7 |
| | | | | | (3) | 27.8 | 44.9 | 52.0 | 54.1 |

(1) water side
(2) air side
(3) total

It may be seen from Tables G and H that for roughly the same moisture content the diffusion surface area within a given period is much greater when using fluorine than when using boron.

EXAMPLE V

In the manner described in Example IV for composition F7 experiments with said composition were carried out with 8 blocks of oak. 4 blocks were kept at a relative humidity of 90% at room temperature, 4 other blocks being placed with one end face on the bottom of glass pots, into which demineralized water was introduced.

The moisture content after 1 week, 2 weeks and 12 weeks as well as the degree of diffusion after 12 weeks were determined as described in Example IV for composition F7.

The results are shown in Tables K and L.

TABLE K

Moisture contents in percent of blocks of oak.
Mean of 4 measurement results.
Measurement point A: 20 mm from the centre of the borehole
Measurement point B: 50 mm from the centre of the borehole
Composition: F7

| Conditions | Start A | Start B | After 1 week A | After 1 week B | After 2 weeks A | After 2 weeks B | After 12 weeks A | After 12 weeks B |
|---|---|---|---|---|---|---|---|---|
| 90% relative humidity | 15.2 | 15.5 | 18.5 | 19.1 | 22.0 | 20.6 | 25.0 | 21.7 |
| Above water | 15.8 | 15.8 | 18.6 | 19.6 | 20.2 | 21.0 | 20.7 | 21.0 |

TABLE L

Diffusion surface area in cm$^2$ and in percent of the cross-sectional surface area of the test block (= 210 cm$^2$)
Mean of 4 measurement results

| Composition: F7 | 90% relative humidity After 12 weeks | Above water After 12 weeks |
|---|---|---|
| Diffusion surface | 96 | 69 |

TABLE L-continued

| Composition: F7 | Diffusion surface area in cm² and in percent of the cross-sectional surface area of the test block (= 210 cm²) Mean of 4 measurement results | |
|---|---|---|
| | 90% relative humidity After 12 weeks | Above water After 12 weeks |
| area in cm² | | |
| Diffusion surface area in percent of the cross-sectional area of the test block | 46 | 33 |

We claim:

1. Composition for the preservation of wood comprising a mixture of a wood preservative with a polymer composition, wherein said wood preservative is not chemically bonded to said polymer composition, and wherein said polymer composition is a polymer alloy prepared from component (a) one or more high molecular polymers possessing anhydride groups and component (b) one or more high molecular polymers containing ester groups, in which the components (a) and (b) are bonded to one another via a hydrogen bridge through complete or total protolysis of component (a).

2. Composition according to claim 1, wherein the polymer alloy consists of (a) a copolymer of styrene and maleic anhydride and (b) polyvinylacetate or a copolymer of ethylene and vinyl acetate.

3. Composition according to claim 1, wherein the polymer or the polymer composition, containing the wood preservative, is coated with a water-permeable coating.

4. Composition according to claim 3, wherein the coating consists of a water-permeable polymer or a water-permeable polymer composition.

5. Composition according to claim 3, wherein the coating consists of a polymer or polymer composition which is water-soluble or water-swellable.

6. Composition according to claim 1, wherein the wood preservative contains one or more boron compounds.

7. Composition according to claim 6, the wood preservative is boric acid and/or borax.

8. Composition according to claim 7, wherein the wood preservative is a mixture of boric acid and borax.

9. Composition according to claim 1, wherein the wood preservative contains a fluorine compound.

10. Composition according to claim 9, wherein wood preservative is a mixture of potassium bifluoride and ammonium bifluoride.

11. Composition according to claim 1, wherein the composition contains both a boron compound and a fluorine compound as wood preservatives.

12. Composition according to claim 1, wherein the composition is in the form of a pellet, a pill or a cylinder.

13. A water activatable wood preserving composition comprising:
(a) a polymer alloy made up of at least one first high molecular weight polymer component having anhydride groups thereon and at least one second high molecular weight polymer component containing ester groups, said first and second components being bonded to each other by a hydrogen bridge; and
(b) a wood preservative;
wherein said wood preservative is mixed with but not bonded to said polymeric component.

14. The composition of claim 13 wherein said wood preservative comprise a boron fluorine or containing compound.

15. The composition of claim 13 further comprising a polymeric water permeable coating surrounding said wood preserving composition.

16. The composition of claim 15 wherein said coating is selected from the group of polymer alloys which may be used as the polymeric component of the wood preserving composition.

17. The composition of claim 13 wherein said polymer alloy consists of (a) a copolymer of styrene and maleic anhydride, and (b) polyvinylacetate.

18. The composition of claim 13 wherein said polymer alloy consists of (a) a copolymer of styrene and maleic anhydride, and (b) a copolymer of ethylene and vinyl acetate.

19. The composition of claim 15 wherein said coating comprises of a polymer alloy of (a) a copolymer of styrene and maleic anhydride, and (b) polyvinylacetate.

20. The composition of claim 15 wherein said coating conprises of a polymer alloy of (a) styrene and maleic anhydride, and (b) a copolymer of ethylene and vinyl acetate.

21. The composition of claim 19 wherein the coating comprises a polymer alloy of (a) from 10-70% by weight of a copolymer of styrene and maleic anhydride, and (b) 90-30% by weight polyvinylacetate.

22. The composition of claim 13 wherein said wood preservative is selected from the group consisting of borax, boric acid and mixtures thereof.

23. The composition of claim 14 wherein said wood preservative comprises $KHF_2$ and $NH_4HF_2$.

24. A water activatable wood preserving composition comprising:
(a) a polymer alloy made up of at least one first high molecular weight polymer component having anhydride groups thereon and at least one second high molecular weight polymer component containing ester groups, said first and second components being bonded to each other by a hydrogen bridge; and
(b) a wood preservative selected from the group consisting essentially of boric acid, borax, fluorine compounds and mixtures thereof, wherein said wood preservative is mixed with but not bonded to said polymer alloy.

25. The composition of claim 24 wherein the polymer alloy consists essentially of
(i) a copolymer of styrene and maleic anhydride, and
(ii) polyvinylacetate.

26. The composition of claim 24 wherein said polymer alloy consists essentially of
(i) a copolymer of styrene and maleic anhydride, and
(ii) a copolymer of ethylene and vinylacetate.

27. The composition of claim 24 wherein the wood preservative is a mixture of boric acid and borax.

28. The composition of claim 24, wherein the wood preservative is a mixture of $KHF_2$ and $NH_4HF_2$.

29. The composition of claim 24 further comprising a water permeable coating comprising a polymer alloy made up of at least one first high molecular weight polymer component having anhydride groups thereon and at least one second high molecular weight polymer component containing ester groups, said first and second components being bonded to each other by a hydrogen bridge.

30. The composition of claim 29 wherein said coating comprises a polymer alloy of
(i) a copolymer of styrene and maleic anhydride, and
(ii) polyvinyl acetate.

31. The composition of claim 29 wherein said coating comprises a polymer alloy of
(i) a copolymer of styrene and maleic anhydride; and
(ii) a copolymer of ethylene and vinyl acetate.

32. The composition of claim 29 wherein said coating comprises a polymer alloy of
(i) from 10–70% by weight of a copolymer of styrene and maleic anhydride; and
(ii) 90–30% by weight of polyvinyl acetate.

33. The composition of claim 24 further comprising a water permeable coating comprising a polymer selected from the group consisting of polyvinylpyrrolidone, polyvinylalcohol, polyethylene glycol, and polyacrylamide.

34. The composition of claim 33 wherein the coating comprises polyvinylalcohol.

35. A water activatable wood preserving composition comprising:
(a) a polymeric component consisting of
(i) a polymer selected from the group consisting of polyvinylpyrrolidone, polyvinylalcohol, polyethylene glycol, and polyacrylamide; or
(ii) a polymer alloy made up of at lest one first high molecular weight polymer component having anhydride groups thereon and at least one second high molecular weight polymer component containing ester groups, said first and second components being bonded to each other by a hydrogen bridge; and
(b) a mixture of $KHF_2$ and $NH_4HF_2$ as a wood preservative.

36. The composition of claim 35 further comprising a water permeable coating comprising a polymer alloy made up of at least one first high molecular weight polymer component having anhydride groups thereon and at least one second high molecular weight polymer component containing ester groups, said first and second components being bonded to each other by a hydrogen bridge.

37. The composition of claim 36 wherein said coating comprises a polymer alloy of
(i) a copolymer of styrene and maleic anhydride; and
(ii) polyvinyl acetate.

38. The composition of claim 36 wherein said coating comprises a polymer alloy of
(i) a copolymer of styrene and maleic anhydride and
(ii) a copolymer of ethylene and vinyl acetate.

39. The composition of claim 36 wherein said coating comprises a polymer alloy of
(i) from 20–70% by weight of a copolymer of styrene and maleic anhydride, and
(ii) 90–30% by weight of polyvinyl acetate.

40. The composition of claim 35 further comprising a water permeable coating comprising a polymer selected from the group consisting of polyvinylpyrrolidone, polyvinylalcohol, polyethylene glycol and polyacrylamide.

41. The composition of claim 40 wherein the coating comprises polyvinylalcohol.

* * * * *